Carlos J. Cardona
INVENTOR.

BY William W. Haefliger
Agent

United States Patent Office 2,809,762
Patented Oct. 15, 1957

2,809,762

PRESSURE VESSEL

Carlos J. Cardona, North Hollywood, Calif., assignor, by mesne assignments, to Fairchild Engine and Airplane Corporation, Hagerstown, Md., a corporation of Maryland Application September 25, 1953, Serial No. 382,290

7 Claims. (Cl. 220—3)

This invention relates to pressure vessels, and more particularly to that type of pressure vessel which is able to safely carry pressurized fluids at pressures greater than 5,000 pounds per square inch.

It is an object of the present invention to provide a pressure vessel which is suitable for use in aircraft as a source of air pressure for operation of pneumatically powered equipment such as flare ejectors or landing gear mechanism, etc.

It is an object of the present invention to provide a novel pressure vessel having a novel wall construction and overall configuration such that the vessel will be able to withstand extremely high internal fluid pressures, and at the same time the vessel will be relatively lightweight and portable, giving it great utility.

It is another object of the invention to provide a pressure vessel in which there is provided a novel ducted means for admitting and exhausting pressurized gases, the means including a novel combination of structural elements and sealing means for preventing escape of highly pressurized gases between the walls of the vessel and the ducted means, and also for uniformly distributing and transferring the stresses to the adjacent vessel walls in such a way as to minimize structural weaknesses in that portion of the vessel associated with the above mentioned ducted means.

It is another object of the invention to provide a pressure vessel having a novel combination wall structure of great strength, the latter including a metallic inner shell and a resin impregnated glass fibre outer shell containing wire strengthening means, all wall elements being combined into a unitary structure in such a way that under extremely high hydrostatic pressures in the vessel the wall structure will expand and adjust itself to the contained pressures to equalize the wall stresses and thereby minimize the occurrence of bursting stresses.

Figure 1:
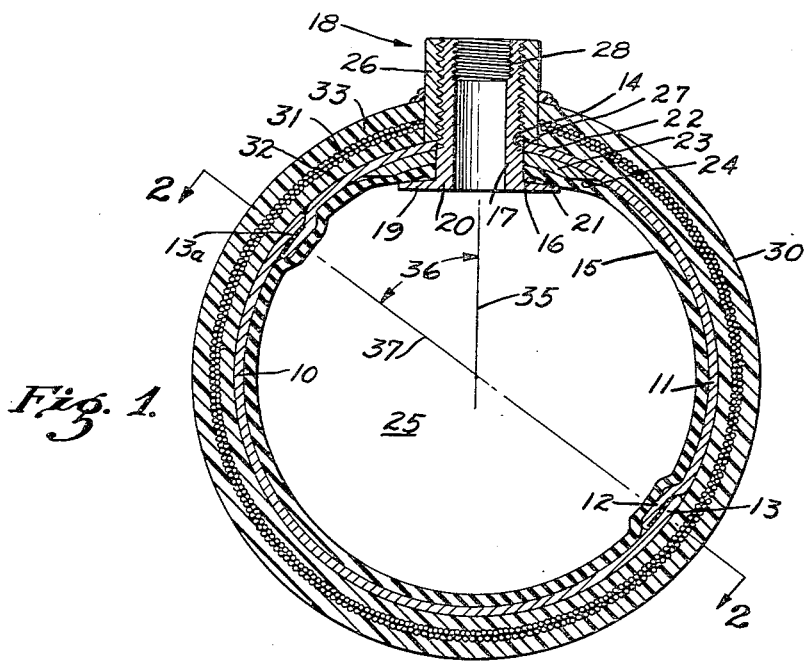
Figure 2:
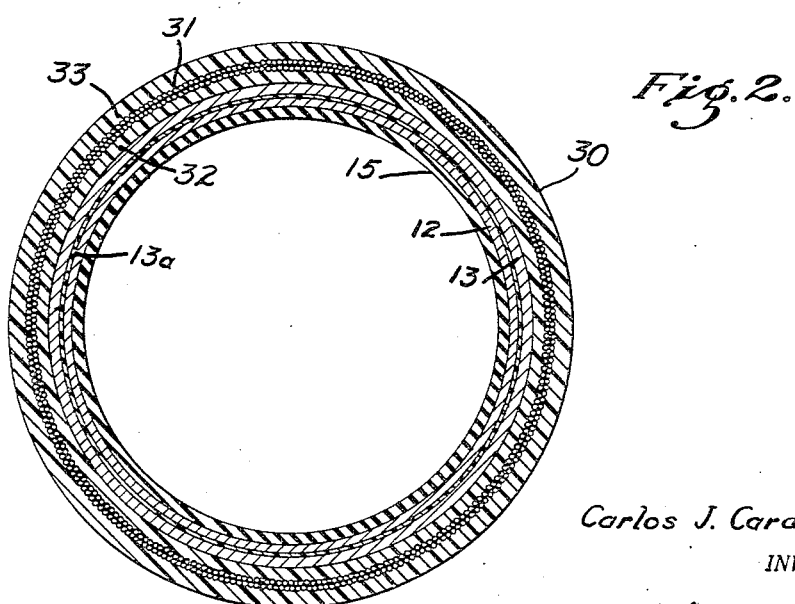

These and other objects and advantages of the present invention will become apparent from a consideration of the following description and the appended claims in conjunction with the accompanying drawings, wherein;

Figure 1 is a cross-sectional view of a preferred embodiment of the pressure vessel; and Figure 2 is a cross-sectional view of the pressure vessel taken on line Z—Z of Figure 1.

Referring to Figure 1, the numerals 10 and 11 designate a pair of thin walled metallic or plastic hemispheres which are mutually complementary in the sense that the annular rim portion 12 of hemisphere 11 is offset radially inwardly by an amount sufficient to permit the rim portion 13 of hemisphere 10 to overlap portion 12. The two hemispheres have equal radii so that when they are joined together they form a thin walled complete sphere, except for an aperture 14 in hemisphere 11. The adjacent rim portions 12 and 13 of the two hemispheres are preferably joined and sealed together with a film of thermosetting resin 13a such as any of the common polyester resins. It will be understood, however, that the two hemispheres may be joined together by other convenient means. The metallic spheres may be made of any formable metal, and preferably a lightweight metal such as aluminum.

Positioned inside the joined hemispheres is a flexible spherically shaped liner 15, made of vinyl or rubber or some similar material referred to herein as "rubbery material" for the reason that it is similar in some respects to rubber. The liner is preferably of such a size as will readily conform to the inner spherical surface of the sphere, and has an aperture formed therein surrounded by an O-ring 16, the diameter thereof being approximately equal to that of the aperture 14 in hemisphere 11. The O-ring 16 and aperture 14 in hemisphere 11 are adapted to receive a tubular shaft 17 forming a component part of an outlet assembly 18. Shaft 17 has an outwardly extending flange 19 formed on the lower portion 20 thereof, the flange forming an abutment means adapted to engage both O-ring 16 and an annular sealing portion 21 of the flexible liner extending around tube 17.

Positioned between the annular portion 21 of the liner and the annular wall portion 22 of hemisphere 11 adjacent aperture 14 is a thin, annular or ring-shaped disc or plate 23, which conforms in curvature to the wall portion 22. Plate 23 is also apertured to receive the tubular shaft 17, and extends outwardly in the general direction of the radius of tube 17 a distance at least as great as the radial extent of flange 19. The lower surface of plate 23 as shown is tapered at the outer edge 24 of the plate toward the upper surface thereof to provide a relatively smooth transition surface from plate 23 to the inner surface of hemisphere 11. Thus the flexible liner will not be subjected to sharp corners at the transition zone when the liner is forced thereagainst, as by the gas pressure within the chamber 25.

The portion of tube 17 extending outwardly from hemisphere 11 is externally threaded to receive an elongated internally threaded member or nut 26. The nut 26 operatively engages tube 17, and the lower end 27 of the nut engages the outer surface of wall portion 22 when the nut is tightened downwardly on the tube. With the nut thus tightened, the flanged portion 19 of tube 17 is pulled upwardly against the sealing portion 21 of liner 15, and the portion 21 is gripped and compressed between the flange 19 and the plate, forming a very tight seal between the liner 15 and the flange 19. High pressure gases in chamber 25 are thereby prevented from escaping or leaking between liner 15 and flange 19 and thence outwardly, via the spaces between adjoining surfaces of the outlet assembly components.

The outer end portion 28 of tube 17 is also internally threaded to receive a threaded adapter, not shown, such as will permit the pressure vessel to be connected to external high pressure ducting or piping. The tube 17 permits ingress and egress of high pressure gas to and from the internal chamber 25.

The spherical shell comprising the two hemispheres 10 and 11 is covered with an outer shell or wall 30 consisting of many turns or windings of glass fibres which have been impregnated with a thermosetting resin such as an epoxy type resin. The windings are laid on the sphere as the sphere is rotated, and as the axis of rotation thereof shifts in space so that no two turns of glass fibre lie directly on top of one another, although portions thereof may overlap. Also, the wrapping of the glass fibres on the sphere is done in a uniform and systematic manner so as to result in an impregnated shell 30 of practically uniform thickness. The windings of glass fibre are wound on the sphere adjacent the nut 26 of the outlet assembly, and bonded thereto by the impregnating resin covering the individual strands of glass fibre. The liquid thermosetting resin covering the glass fibre windings already laid on the sphere is adapted to cure under the application of radiant heat as additional layers of impregnated fibres are built up on the sphere. Thus, the resin impregnated shell 30 cures from the inside surface toward the outside surface, as heat is applied.

The shell 30 also has integrally formed therein a layer 31 comprising many windings of fine metal wire. The wire is wound on the sphere along with the impregnated glass fibres so as to be combined integrally therewith and bonded thereto. The layer 31 lies between inner layer 32 and outer layer 33 of impregnated glass fibres, so as to form a unitary outer shell 30 comprising alternate layers of impregnated glass fibres and glass fibres plus wire windings. When the outer shell 30 has completely cured, it forms an extremely tough outer case able to withstand radial and tangential stresses generated by thousands of pounds of gas pressure in chamber 25. For example, a spherical vessel having an inner aluminum shell about ⅛ inch thick and an outer shell as described about ⅜ inch thick was tested successfully and withstood gas pressures in chamber 25 upwards of 10,000 pounds per square inch. The outer shell 30 also is non-shatterable due to the wire windings. A 20 millimeter shell fired through the vessel walls failed to shatter the pressurized sphere and produced only entrance and exit holes in the walls.

An important feature of the present invention lies in locating the outlet assembly 18 in such a position that the axis 35 thereof lies at an angle 36 to the plane 37 through the rims 12 and 13 of the hemispheres, the angle 36 lying within the range 25 degrees to 65 degrees. With angle 36 lying between these limits, I have found that the bursting pressure of the sphere is maximized, or in other words, the internal gas pressure which the sphere will withstand without rupture is increased to a practical maximum.

I claim:

1. A pressure vessel including: a thin-walled spherical shell, and a second shell formed on the outside of said first shell, said second shell including a first layer of glass fiber windings, a second layer of glass fiber and metal wire windings, and a third layer of glass fiber windings, said windings being impregnated with a thermosetting resin to form a high-strength non-shatterable housing for said first shell, and at least said windings of metal wire being approximately circumferential with adjacent turns thereof being shifted with respect to each other so that adjacent turns do not lie continuously one upon the other and so that there is a complete circumferential reenforcement of said sphere in a number of different directions upon the surface thereof to effectively resist explosion of the sphere by internal pressure.

2. In a pressure vessel: a spherical liner of rubbery material having an opening in one side thereof; a tubular connector extending through said opening and having a flange on the inner end thereof overlapping and bearing against the annular wall of rubbery material of said liner surrounding said opening of said liner; two thin walled hemispheres assembled around said liner with their rims in engagement so as to form a thin walled sphere containing said liner, one of said hemispheres having an opening therein to receive the projecting portion of said tubular connector; means on the projecting portion of said tubular connector acting to hold said connector outwardly so that said flange thereof will be held in pressural engagement with said annular wall of said liner surrounding said opening therein; and a reenforcing exterior layer comprising glass fibers wound on said sphere and being impregnated with a resin.

3. In a pressure vessel: a spherical liner of rubbery material having an opening in one side thereof; a tubular connector extending through said opening and having a flange on the inner end thereof overlapping and bearing against the annular wall of rubbery material of said liner surrounding said opening of said liner; two thin walled hemispheres assembled around said liner with their rims in engagement so as to form a thin walled sphere containing said liner, one of said hemispheres having an opening therein to receive the projecting portion of said tubular connector; means on the projecting portion of said tubular connector acting to hold said connector outwardly so that said flange thereof will be held in pressural engagement with said annular wall of said liner surrounding said opening therein; and a reenforcing exterior layer comprising glass fibers and high tensile strength metal wire wound on said sphere and being impregnated with a resin.

4. In a pressure vessel: a spherical liner of rubbery material having an opening in one side thereof; a tubular connector extending through said opening and having a flange on the inner end thereof overlapping and bearing against the annular wall of rubbery material of said liner surrounding said opening of said liner; two thin walled hemispheres assembled around said liner with their rims in engagement so as to form a thin walled sphere containing said liner, one of said hemispheres having an opening therein to receive the projecting portion of said tubular connector; a reenforcing ring positioned between said annular wall of said liner and the annular wall of said one of said hemispheres which surrounds the opening therein to receive the projecting portion of said tubular connector; means on the projecting portion of said tubular connector acting to hold said connector outwardly so that said flange thereof will clamp said annular wall portion of said liner against said reenforcing ring; and a reenforcing exterior layer comprising glass fibers wound on said sphere and being impregnated with a resin.

5. In a pressure vessel: a spherical liner of rubbery material having an opening in one side thereof; a tubular connector extending through said opening and having a flange on the inner end thereof overlapping and bearing against the annular wall of rubbery material of said liner surrounding said opening of said liner; two thin walled hemispheres assembled around said liner with their rims in engagement so as to form a thin walled sphere containing said liner, one of said hemispheres having an opening therein to receive the projecting portion of said tubular connector; a reenforcing ring positioned between said annular wall of said liner and the annular wall of said one of said hemispheres which surrounds the opening therein to receive the projecting portion of said tubular connector; means on the projecting portion of said tubular connector acting to hold said connector outwardly so that said flange thereof will clamp said annular wall portion of said liner against said reenforcing ring; and a reenforcing exterior layer comprising glass fibers and high tensile strength metal wire wound on said sphere and being impregnated with a resin.

6. In a pressure vessel: a spherical liner of rubbery material having an opening in one side thereof; a tubular connector extending through said opening and having a flange on the inner end thereof overlapping and bearing against the annular wall of rubbery material of said liner surrounding said opening of said liner; two thin walled hemispheres assembled around said liner with their rims in engagement so as to form a thin walled sphere containing said liner, one of said hemispheres having an opening therein to receive the projecting portion of said tubular connector, one of said rims fitting within the other and said hemispheres having shoulders engaging so as to limit the movement of one of said rims within the other when inwardly acting pressure is applied to the exterior of the sphere; means on the projecting portion of said tubular connector acting to hold said connector outwardly so that said flange thereof will be held in pressural engagement with said annular wall of said liner surrounding said opening therein; and a reenforcing exterior layer comprising glass fibers wound on said sphere and being impregnated with a resin.

7. In a pressure vessel: a spherical liner of rubbery material having an opening in one side thereof; a tubular connector extending through said opening and having a flange on the inner end thereof overlapping and bearing against the annular wall of rubbery material of said liner surrounding said opening of said liner; two thin walled hemispheres assembled around said liner with their rims in engagement so as to form a thin walled sphere containing said liner, one of said hemispheres having an opening therein to receive the projecting portion of said tubular connector, one of said rims fitting within the other and said hemispheres having shoulders engaging so as to limit the movement of one of said rims within the other when inwardly acting pressure is applied to the exterior of the sphere; a reenforcing ring positioned between said annular wall of said liner and the annular wall of said one of said hemispheres which surrounds the opening therein to receive the projecting portion of said tubular connector; means on the projecting portion of said tubular connector acting to hold said connector outwardly so that said flange thereof will clamp said annular wall portion of said liner against said reenforcing ring; and a reenforcing exterior layer comprising glass fibers and high tensile strength metal wire wound on said sphere and being impregnated with a resin.

References Cited in the file of this patent

UNITED STATES PATENTS

| | | |
|---|---|---|
| 1,966,241 | Furrer | July 10, 1934 |
| 2,113,060 | Sandberg | Apr. 5, 1938 |
| 2,256,386 | Farrar et al. | Sept. 16, 1941 |
| 2,395,556 | Kopplin | Feb. 26, 1946 |
| 2,437,058 | Waters | Mar. 2, 1948 |
| 2,467,999 | Stephens | Apr. 19, 1949 |
| 2,594,693 | Smith | Apr. 29, 1952 |
| 2,653,887 | Slayter | Sept. 29, 1953 |

FOREIGN PATENTS

| | | |
|---|---|---|
| 684,949 | Germany | Dec. 8, 1939 |
| 586,183 | Great Britain | Mar. 10, 1947 |